(No Model.) 2 Sheets—Sheet 1.
A. T. & F. W. LAWSON & S. DEAR.
MACHINE FOR PREPARING FLAX, HEMP, JUTE, WOOL, AND OTHER FIBERS.
No. 443,999. Patented Jan. 6, 1891.
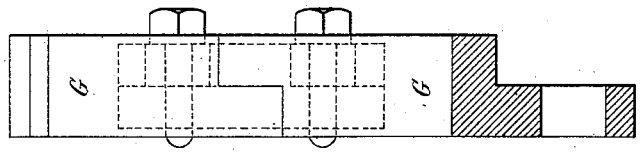
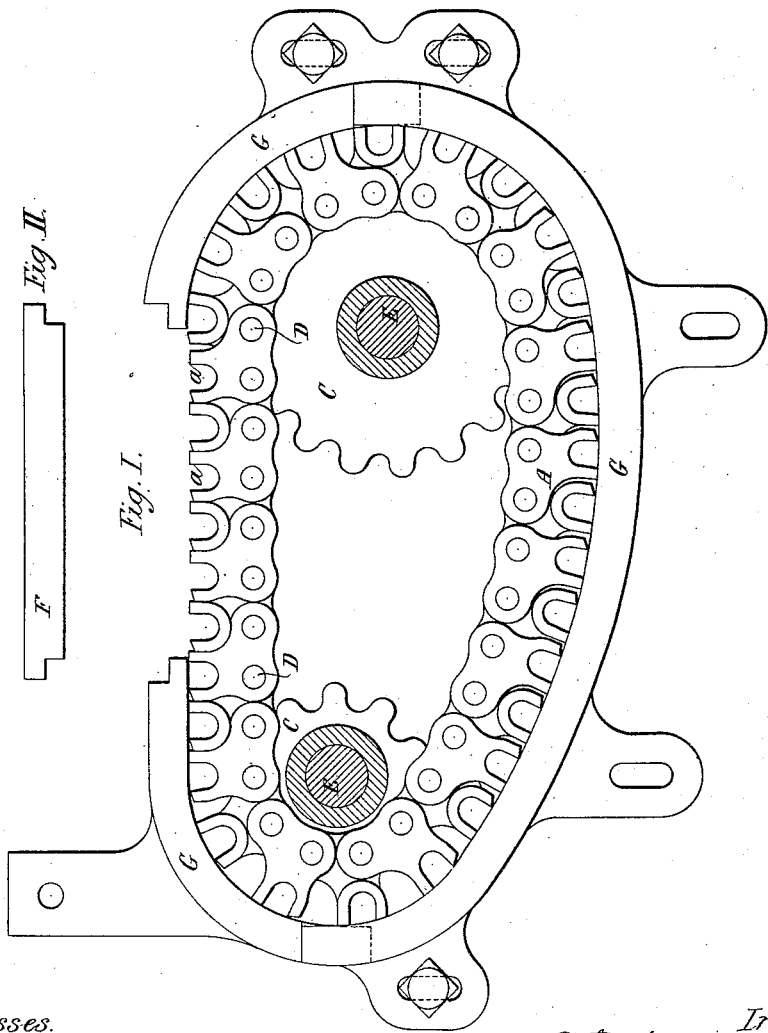
Witnesses.
C. W. Brooke
Baltus DeLong
Inventors.
Arthur Tredgold Lawson,
Frederick William Lawson,
Somerville Dear,
By their Att'ys.
Baldwin, Davidson & Wight.

(No Model.) 2 Sheets—Sheet 2.
A. T. & F. W. LAWSON & S. DEAR.
MACHINE FOR PREPARING FLAX, HEMP, JUTE, WOOL, AND OTHER FIBERS.
No. 443,999. Patented Jan. 6, 1891.
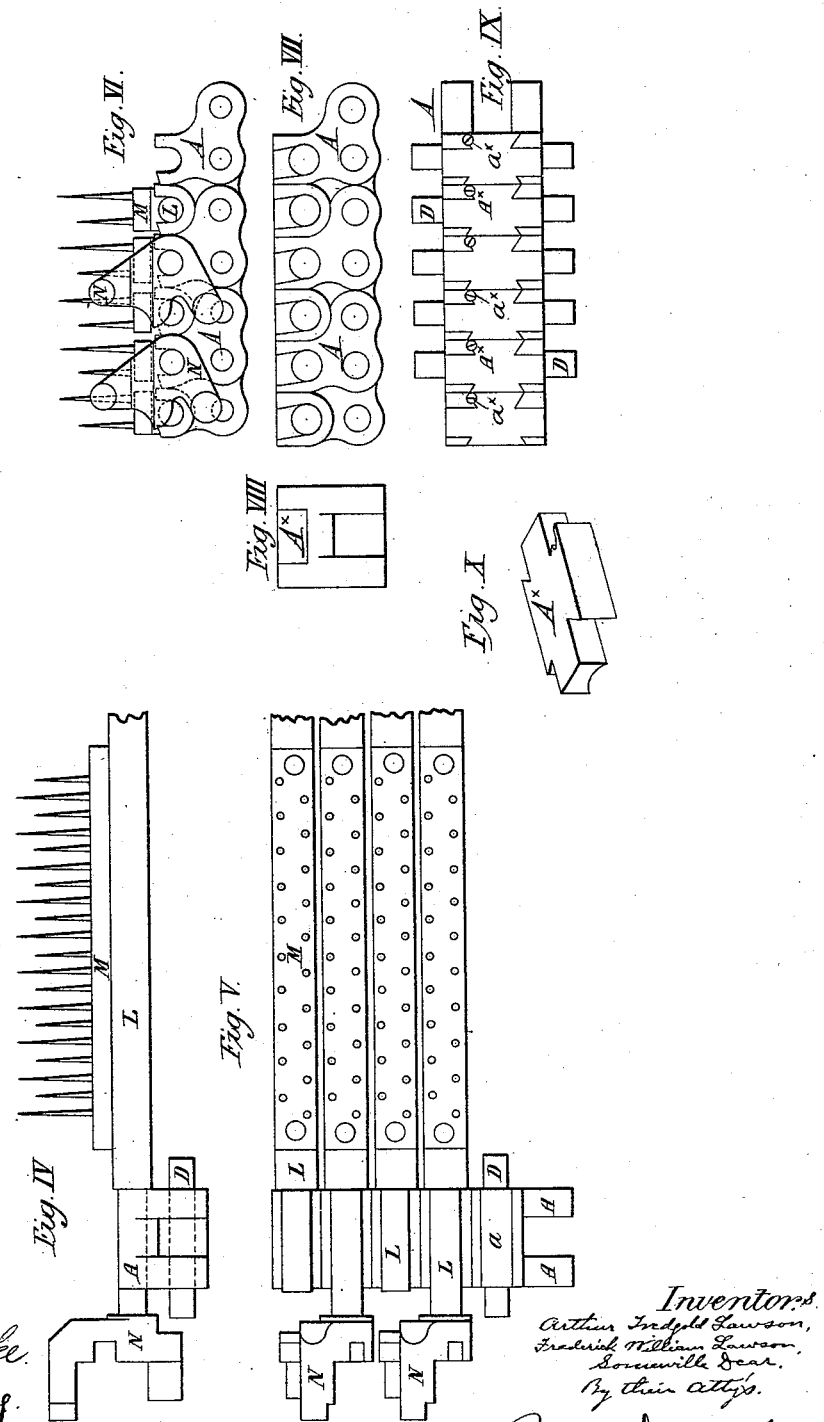
Witnesses. 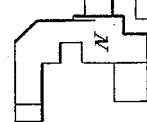

United States Patent Office.

ARTHUR TREDGOLD LAWSON, FREDERICK WILLIAM LAWSON, AND SOMERVILLE DEAR, OF LEEDS, ENGLAND.

MACHINE FOR PREPARING FLAX, HEMP, JUTE, WOOL, AND OTHER FIBERS.

SPECIFICATION forming part of Letters Patent No. 443,999, dated January 6, 1891.

Application filed June 17, 1890. Serial No. 355,810. (No model.)

*To all whom it may concern:*

Be it known that we, ARTHUR TREDGOLD LAWSON, engineer, FREDERICK WILLIAM LAWSON, engineer, and SOMERVILLE DEAR, manager, subjects of the Queen of Great Britain, all residing at the Hope Foundry, Leeds, in the county of York, England, have invented certain new and useful Improvements in Machines for Preparing Flax, Hemp, Jute, Wool, and other Fibers, of which the following is a specification.

The improvements relate to machines for preparing flax, hemp, jute, wool, and other fibers where chains are used to carry fallers or gill-bars; and it consists of having the links in which the gill-bars are held made with U-like openings at the top, into which the necks of the gill-bars are received. This enables us to take out any bar at the top of the chain, being the most suitable place, as the top of the links are open. To keep the bars in their places in the openings in the links we put guides around the chain covering the necks of the bars. In these guides at the top there can be loose pieces which can be taken off when the bars have to be removed. In other respects the links are as before made, thus retaining the strength of the chain and having the advantage of the gill-bars, being all linked together. Sometimes we make the links with loose caps screwed on the top. These caps can be removed and any bar can be taken out. The bars are controlled by dogs at their ends working upon stationary cam-guides, as heretofore.

In order that our said invention may be fully understood and readily carried into effect, we will proceed to describe the drawings hereunto annexed.

Figure I is an elevation of one of the endless chains and guides constructed according to our invention. Fig. II represents the movable guide-cover. Fig. III is an inside sectional view of the guide, showing the joint formed between the upper and lower parts of the guide. Fig. IV is a back elevation of a part of one of the gill-bars with chain and dog. Fig. V is a plan showing part of four gill-bars with the open chain links and dogs. Fig. VI is an end view of the parts represented in Fig. V. Fig. VII shows part of a chain with links having a separate cap for each link. Fig. VIII is an end view of one of the links. Fig. IX is a plan of the links, showing the cap dovetailed and screwed into each separate link as in Figs. VII and VIII. Fig. X is a perspective view of the cap.

A A designate the chain links, and $a$ the U or open parts of the links for carrying the gill-bars; C C, the chain wheels or carriers; D D, the chain-link pins which gear into the carriers on each side of the chain; E E, the chain-carrier shafts; G, the guide around the chain, keeping or guiding the gill-bars within the U or open parts of the link.

The guide-cover F is shown in Fig. II.

L are the gill-bars, and M the gills. N are the dogs on the end of the gill-bars, the alternate bars having their guides at opposite ends. The cams are not shown.

In Figs. VII, VIII, IX, and X, $A^\times$ $A^\times$ are the separate caps with which the links may be provided. Each cap is held down by a screw $a^\times$ at one corner. When these caps are used, the guides G may be dispensed with.

What we claim is—

1. A chain gill with U-form or open recesses in the links in which the necks of the gill-bars are held and are able to turn.

2. A chain gill with U-form or open recesses in the links in which the necks of the gill-bars are held and with stationary guides retaining the gill-bars in place, substantially as described.

ARTHUR TREDGOLD LAWSON.
FREDERICK WILLIAM LAWSON.
SOMERVILLE DEAR.

Witnesses:
HY. ATKINSON,
WM. FANT,
*Clerks to Messrs. T. & H. Greenwood Teale, Solicitors, Leeds.*